(12) United States Patent
Park et al.

(10) Patent No.: US 11,442,380 B2
(45) Date of Patent: Sep. 13, 2022

(54) CONTROLLING TONER REFILL BY USING TONER REFILL CARTRIDGE

(71) Applicant: Hewlett-Packard Development Company, L.P., Spring, TX (US)

(72) Inventors: Jea Hong Park, Seongnam-si (KR); Jang-Geun Kim, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/279,258

(22) PCT Filed: Aug. 7, 2019

(86) PCT No.: PCT/US2019/045411
§ 371 (c)(1),
(2) Date: Mar. 24, 2021

(87) PCT Pub. No.: WO2020/180343
PCT Pub. Date: Sep. 10, 2020

(65) Prior Publication Data
US 2022/0004121 A1    Jan. 6, 2022

(30) Foreign Application Priority Data

Mar. 6, 2019 (KR) .......................... 10-2019-0025648

(51) Int. Cl.
*G03G 15/08* (2006.01)
*G03G 21/18* (2006.01)
(Continued)

(52) U.S. Cl.
CPC ..... *G03G 15/0894* (2013.01); *G03G 15/0863* (2013.01); *G03G 15/5079* (2013.01);
(Continued)

(58) Field of Classification Search
CPC ........... G03G 15/0894; G03G 15/0863; G03G 15/5079; G03G 21/1892; G03G 21/181;
(Continued)

(56) References Cited

U.S. PATENT DOCUMENTS 6,325,495 B1 * 12/2001 Foth ..................... B41J 2/17546
347/85
6,748,182 B2    6/2004 Yoshida et al.
(Continued)

FOREIGN PATENT DOCUMENTS

CN         105793812 A      7/2016
JP         2008-15548 A     1/2008
(Continued)

*Primary Examiner* — Ryan D Walsh
(74) *Attorney, Agent, or Firm* — Jefferson IP Law, LLP

(57) ABSTRACT

An example image forming apparatus includes a main body, a toner refilling portion, and a controller. On the main body, a development cartridge is mounted. The toner refilling portion is connected to the development cartridge and a toner refill cartridge inserted through a communicating portion of the main body and thus receives, from the toner refill cartridge, authentication information obtained from the toner refill cartridge, thereby adjusting a toner inflow from the toner refill cartridge to the development cartridge. A controller determines whether to allow a toner refill using the toner refill cartridge based on the authentication information obtained from the toner refill cartridge and authentication information obtained from the image forming apparatus and controls the toner refilling portion according to a determination result.

18 Claims, 12 Drawing Sheets

(51) Int. Cl.
*G06F 21/44* (2013.01)
*G03G 15/00* (2006.01)
*B41J 2/175* (2006.01)

(52) U.S. Cl.
CPC ......... *G03G 21/1892* (2013.01); *G06F 21/44* (2013.01); *B41J 2/17546* (2013.01); *G03G 21/181* (2013.01); *G03G 2215/00987* (2013.01); *G03G 2215/066* (2013.01); *G03G 2215/0697* (2013.01); *G03G 2221/1823* (2013.01)

(58) Field of Classification Search
CPC ... G03G 2215/00987; G03G 2215/066; G03G 2215/0697; G03G 2221/1823; G06F 21/44; B41J 2/17546
See application file for complete search history.

(56) References Cited

U.S. PATENT DOCUMENTS

| | | | |
|---|---|---|---|
| 2005/0141901 A1 | 6/2005 | Lee | |
| 2006/0023249 A1* | 2/2006 | Simpson | G06F 3/1288 358/1.15 |
| 2006/0029400 A1* | 2/2006 | Nasu | H04L 9/0894 399/109 |
| 2006/0051106 A1* | 3/2006 | Takahashi | G03G 15/0863 399/27 |
| 2006/0093381 A1 | 5/2006 | Lee | |
| 2011/0093702 A1* | 4/2011 | Eom | G03G 15/0868 713/168 |
| 2011/0211850 A1* | 9/2011 | Kim | G03G 15/55 399/12 |
| 2014/0270814 A1* | 9/2014 | Ignatchenko | G03G 15/0863 399/27 |
| 2017/0032135 A1* | 2/2017 | Refstrup | G06F 21/608 |
| 2018/0341197 A1 | 11/2018 | Ignatchenko et al. | |
| 2019/0143704 A1* | 5/2019 | Smith | B41J 2/17543 347/14 |
| 2021/0026273 A1* | 1/2021 | Jung | G03G 15/0877 |
| 2021/0080871 A1* | 3/2021 | Lee | G03G 21/1652 |
| 2021/0200119 A1* | 7/2021 | Lim | G03G 15/0863 |
| 2021/0356883 A1* | 11/2021 | Kim | G06F 21/44 |

FOREIGN PATENT DOCUMENTS

| | | | |
|---|---|---|---|
| KR | 10-0366029 B1 | 3/2003 | |
| KR | 10-0498053 B1 | 7/2005 | |
| KR | 10-0533835 B1 | 12/2005 | |
| KR | 10-0601653 B1 | 7/2006 | |
| WO | WO-2017194913 A1 * | 11/2017 | ......... B41J 2/17513 |

* cited by examiner

CONTROLLING TONER REFILL BY USING TONER REFILL CARTRIDGE

BACKGROUND

An image forming apparatus such as a printer and a multi-function printer may provide toner contained in a development cartridge to an electrostatic latent image formed on a photoconductor and thus may form a visible toner image. When the toner contained in the development cartridges is consumed, the development cartridge having no toner may be replaced with a new development cartridge, or toner may be refilled in the development cartridge.

It is desirable to increase revenue from sales of toner by allowing toner providers, who sell toner as well as image forming apparatuses, to restrict users to use toner not obtained from different channels but toner that the toner providers provide and for maintaining conditions of image forming apparatuses to the greatest extent by providing the users genuine toner.

DETAILED DESCRIPTION OF EXAMPLES

Figure 1:
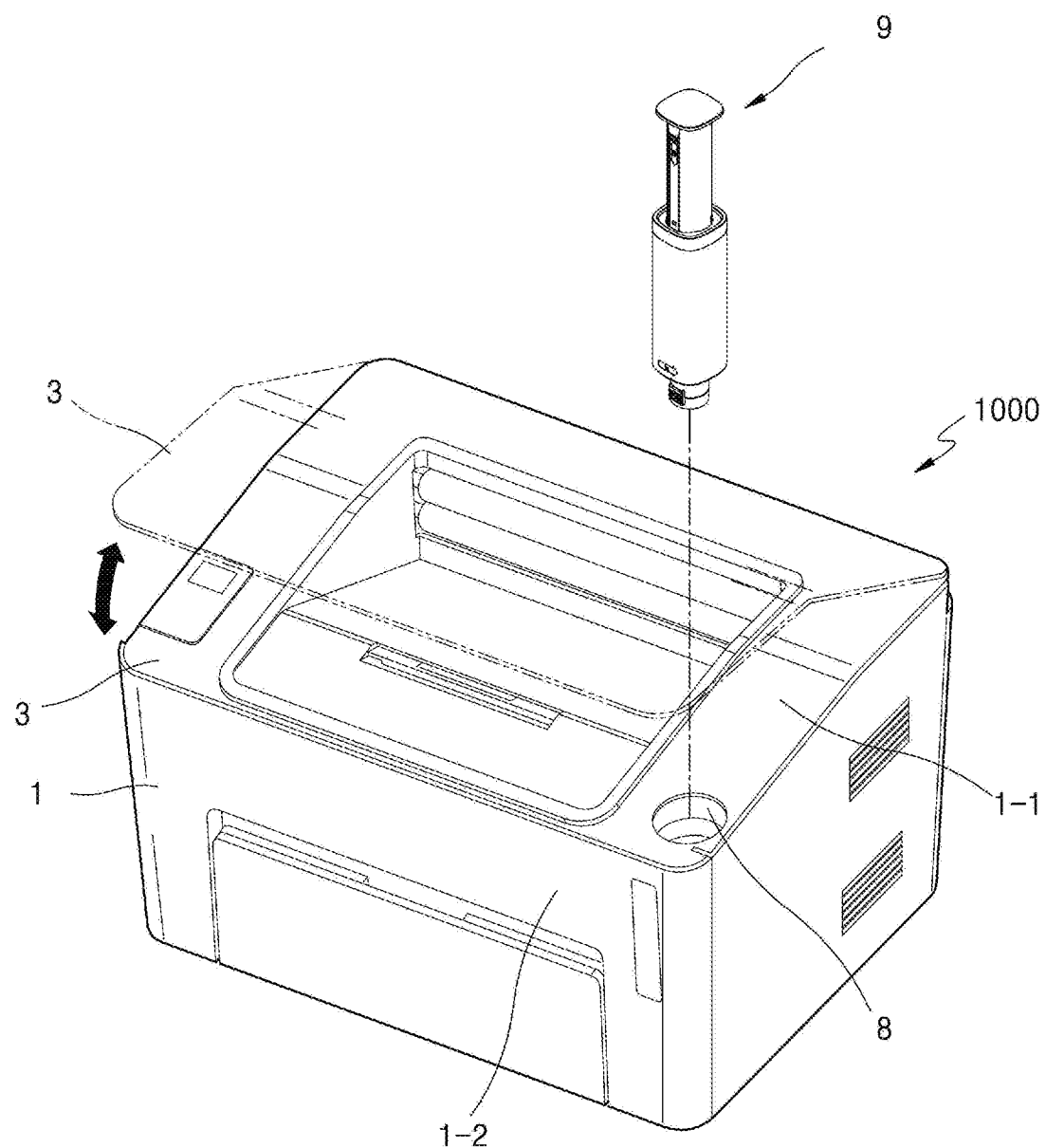
FIG. 1 is a diagram illustrating an image forming apparatus and a toner refill cartridge to refill toner, according to an example.

Hereinafter, one or more examples will be described with reference to the attached drawings. Like reference numerals in the description and the drawings denote elements having substantially the same functions, and thus a repeat description may be omitted.

Figure 2:
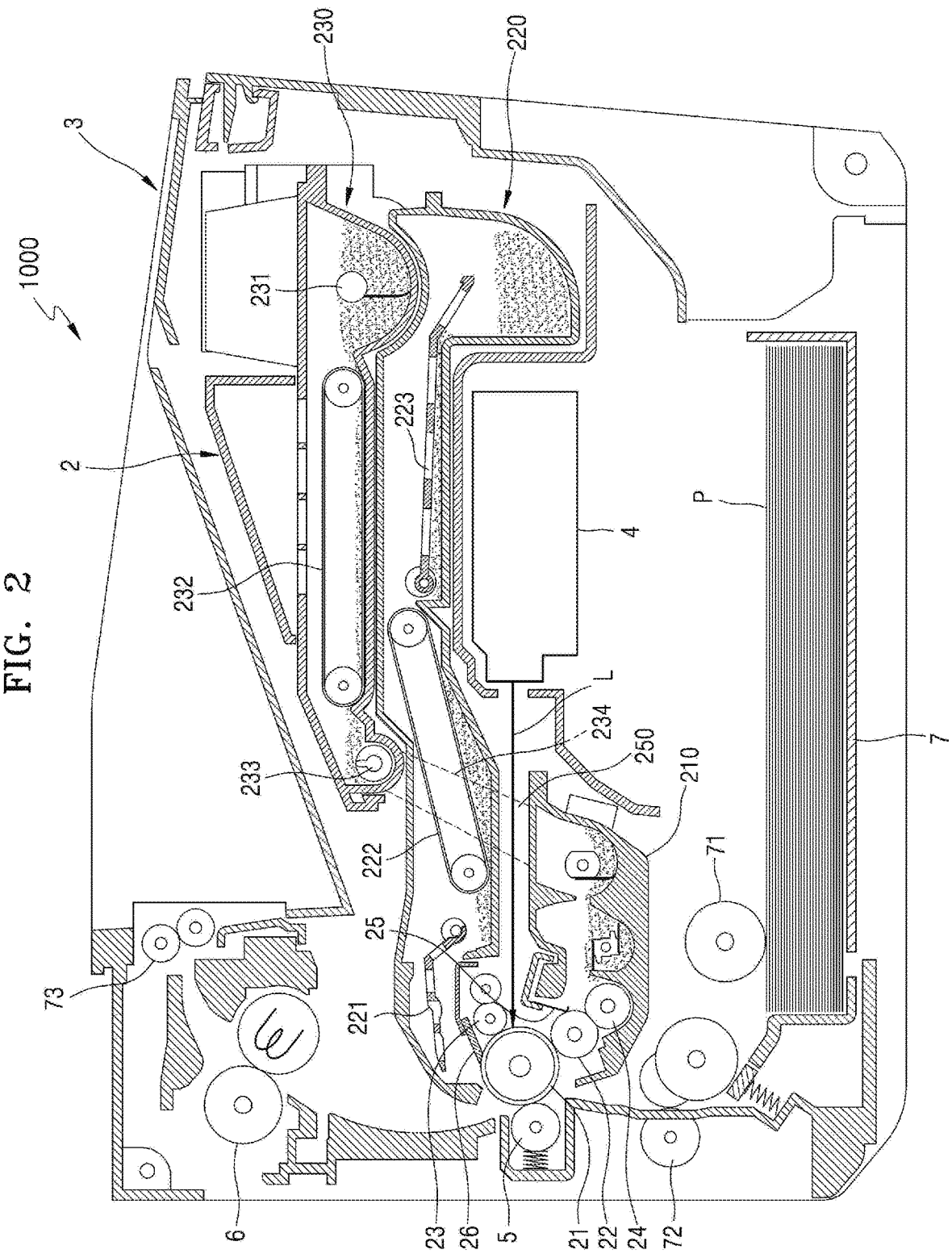
FIG. 2 is a diagram of an image forming apparatus, according to an example.
Figure 3:
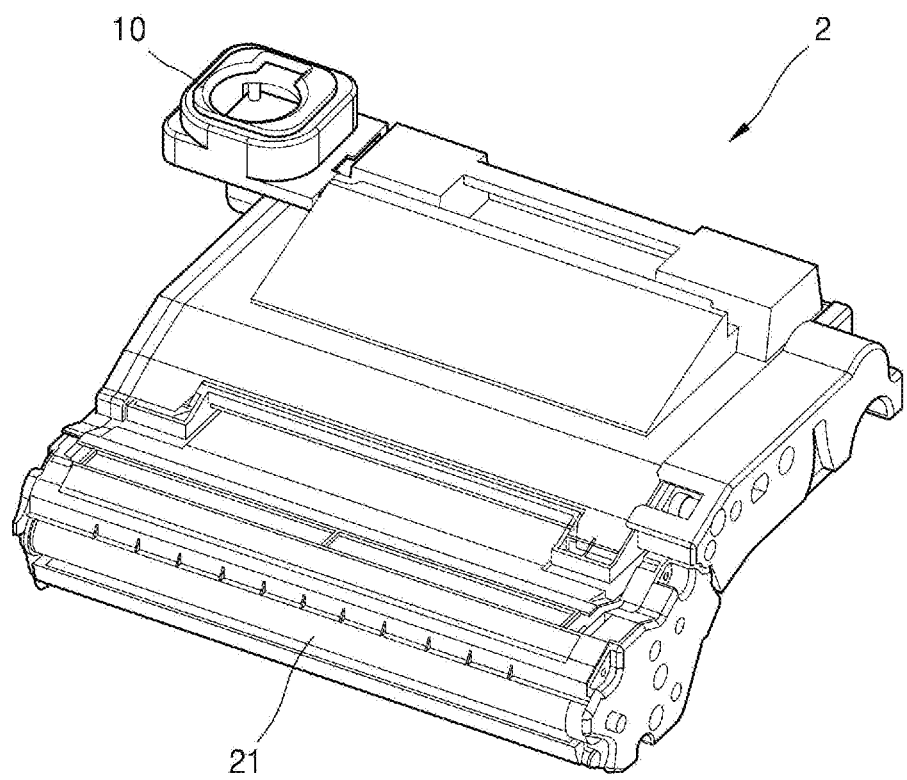
FIG. 3 is a diagram of a development cartridge employed in an image forming apparatus and a toner refilling portion connected to the development cartridge, according to an example.

FIG. 1 is a diagram illustrating an image forming apparatus and a toner refill cartridge to refill toner, according to an example. FIG. 2 is a diagram of an image forming apparatus, according to an example. FIG. 3 is a diagram of a development cartridge employed in an image forming apparatus and a toner refilling portion connected to the development cartridge, according to an example. The image forming apparatus may perform an image forming job such as copying, printing, scanning, or faxing. The image forming apparatus may form an image on a recording medium such as print paper in various print manners such as an electrophotographic method, an inkjet method, a heat transfer method, a thermosensitive method, or the like.

Referring to FIGS. 1 to 3, an image forming apparatus 1000 may include a main body 1 and a development cartridge 2 that is in a cartridge form and detachable from the main body 1. The main body 1 may include a door 3. The door 3 may open or close part of the main body 1. FIG. 1 shows an example in which the door 3 opens an upper portion of the main body 1. However, in other examples, the main body 1 may include a door opening a side portion or all of the main body 1. A user may open the door 3 and mount the development cartridge 2 in the main body 1 or remove the development cartridge 2 from the main body 1. While the development cartridge 2 is mounted in the main body 1, the main body 1 may include a communicating portion 8 that enables access to a toner refilling portion 10 from outside of the main body 1. The communicating portion 8 may be at a location close to a front portion 1-2 of the main body 1. Because the front portion 1-2 faces the user, the user may access the communicating portion 8. Thus, a toner refilling job using a toner refill cartridge 9 may be performed by using the communicating portion 8. The communicating portion 8 may be on an upper portion 1-1 of the main body 1. The toner refilling portion 10 may be on a lower portion of the communicating portion 8. The communicating portion 8 and the toner refilling portion 10 may be aligned in a vertical direction. The toner refill cartridge 9 may access the toner refilling portion 10 through the communicating portion 8 from the top of the main body 1.

A photoconductive drum 21 is an example of a photoconductor on which an electrostatic latent image may be formed and may include a photoconductive layer having photoconductivity and formed on a cylindrical metal pipe and an outer circumference thereof. A charging roller 23 is an example of a charger that charges a surface of the photoconductive drum 21 at a uniform electric potential. A charging bias voltage may be applied to the charging roller 23. A corona charger (not shown) may be used instead of the charging roller 23. A developing roller 22 may supply the toner to the electrostatic latent image formed on the surface of the photoconductive drum 21 and may develop the electrostatic latent image.

A supply roller 24 may attach the toner to the developing roller 22. A supply bias voltage may be applied to the supply roller 24 to attach the toner to the developing roller 22. A regulator 25 may regulate an amount of the toner attached to a surface of the developing roller 22. The regulator 25 may be, for example, a regulating blade of which a front end contacts the developing roller 22 at a certain pressure. A cleaning member 26 may remove a residual toner and impurities from the surface of the photoconductive drum 21 before the surface of the photoconductive drum 21 is charged. The cleaning member 26 may be, for example, a cleaning blade of which a front end contacts the surface of the photoconductive drum 21. Hereinafter, the impurities removed from the surface of the photoconductive drum 21 will be referred to as a waste toner.

An optical scanner 4 may scan light, which is modulated according to image information, to the surface of the photoconductive drum 21 that is charged at the uniform electric potential. For example, a laser scanning unit (LSU) may be used as the optical scanner 4, the LSU deflecting light, which is emitted from a laser diode, in a main scanning direction by using a polygon mirror and scanning the deflected light to the photoconductive drum 21.

A transfer roller 5 is an example of a transfer unit located opposite the photoconductive drum 21 and forming a transfer nip. To the transfer roller 5, a transfer bias voltage for transferring a toner image, which is developed on the surface of the photoconductive drum 21, to a print medium P may be applied. A corona transfer unit may be used instead of the transfer roller 5.

The toner image, which is transferred to a surface of the print medium P by the transfer roller 5, may remain on the surface of the print medium P due to electrostatic attraction. A fuser 6 may apply heat and pressure to the toner image and fuse the toner image to the print medium P, thereby forming a permanent print image on the print medium P.

The development cartridge 2 may include a developing portion 210, on which the photoconductive drum 21 and the developing roller 22 are mounted, a waste toner container 220 containing the waste toner removed from the photoconductive drum 21, and a toner container 230 connected to the developing portion 210 and containing the toner. To refill the toner in the toner container 230, the development cartridge 2 may include the toner refilling portion 10 connected to the toner container 230. The toner refilling portion 10 provides an interface between the toner refill cartridge 9 and the development cartridge 2. The development cartridge 2 may be a development cartridge of an integral type that includes the developing portion 210, the waste toner container 220, the toner container 230, and the toner refilling portion 10.

Portions of an outer circumference of the photoconductive drum 21 may be exposed to the outside of a housing. The transfer roller 5 contacts the exposed portions of the photoconductive drum 21, and thus the transfer nip may be formed. On the developing portion 210, at least one conveying member may be installed to convey the toner towards the developing roller 22. The conveying member may stir the toner and charge the toner at a certain electric potential.

The waste toner container 220 may be on an upper portion of the developing portion 210. The waste toner container 220 may be apart from the developing portion 210 in an upward direction, and an optical path 250 may be formed therebetween. The waste toner removed from the photoconductive drum 21 by the cleaning member 26 may be contained in the waste toner container 220. The waste toner removed from the surface of the photoconductive drum 21 may be transported to the inside of the waste toner container 220 by one or more waste toner transporting members 221, 222, and 223. Shapes and the number of waste toner transporting members are not especially limited. By taking the capacity and a shape of the waste toner container 220 into account, an appropriate number of waste toner transporting members may be installed at appropriate locations to effectively distribute the waste toner inside the waste toner container 220.

The toner container 230 may be connected to the toner refilling portion 10 and may contain the toner. The toner container 230 may be connected to the developing portion 210 by a toner supply 234 as indicated in FIG. 2 by dashed lines. As shown in FIG. 2, the toner supply 234 may be connected to the developing portion 210 by penetrating the waste toner container 220 in a vertical direction. The toner supply 234 may be on an outer portion of an effective width of exposed light L, which is scanned by the optical scanner 4 in the main scanning direction, to prevent interference with the exposed light L.

In the toner container 230, one or more toner supply members 231, 232, and 233 for supplying the toner to the developing portion 210 through the toner supply 234 may be installed. Shapes and the number of toner supply members are not limited. By taking the capacity or a shape of the toner container 230 into account, an appropriate number of toner supply members may be at appropriate locations of the toner container 230 to effectively supply the toner to the developing portion 210. The toner supply member 233 may transport the toner to the toner supply 234.

Examples of image forming operations performed by the above-described structures will be briefly described. A charging bias may be applied to the charging roller 23, and the photoconductive drum 21 may be charged at the uniform electric potential. The optical scanner 4 may scan light, which is modulated according to the image information, to the photoconductive drum 21 and may form the electrostatic latent image on the surface of the photoconductive drum 21. The supply roller 24 may attach the toner to the surface of the developing roller 22. The regulator 25 may form a toner layer having a uniform thickness on the surface of the developing roller 22. A developing bias voltage may be applied to the developing roller 22. As the developing roller 22 rotates, the toner transported to a development nip may be moved and attached to the electrostatic latent image formed on the surface of the photoconductive drum 21 due to the development bias voltage, and thus a visible toner image may be formed on the surface of the photoconductive drum 21. The print medium P discharged from a loading tray 7 by a pickup roller 71 may be transported by a transfer roller 72 to a transfer nip on which the transfer roller 5 and the photoconductive drum 21 face each other. When the transfer bias voltage is applied to the transfer roller 5, the toner image may be transferred to the print medium P due to the electrostatic attraction. When the toner image transferred to the print medium P is fused to the print medium P as heat and pressure are applied to the toner image by the fuser 6, the printing may be completed. The print medium P may be discharged by a discharge roller 73. A toner remaining on the surface of the photoconductive drum 21 may not be transferred to the print medium P and may be removed by the cleaning member 26.

According to an example, the development cartridge 2 may include the toner refilling portion 10 to refill the toner in the development cartridge 2 by using the toner refill cartridge 9 while the development cartridge 2 is not removed from the main body 1 and mounted thereon. The toner refilling portion 10 according to an example may be integrally formed with the development cartridge 2 and may be detachable from the main body 1 together with the development cartridge 2.

The toner refilling portion 10 may be connected to the development cartridge 2 and to the toner refill cartridge 9 inserted through the communicating portion 8 formed in the main body 1. The toner refill cartridge 9 may vary in size and shape from a disposable toner refill cartridge having an amount of toner that may be charged once to a high-capacity toner refill cartridge having an amount of toner that may be charged several times. As an example, because the high-capacity toner refill cartridge 9 may perform toner refills several times in the image forming apparatuses 1000, using only genuine toner provided by a certain toner provider is allowed after the authentication of the high-capacity toner refill cartridge 9. Thus, revenue from sales of toner may increase and conditions of the image forming apparatus 1000 may be maintained to the greatest extent.

Hereinafter, an example operation, in which the image forming apparatus 1000 repeatedly performs toner refill by using a toner refill cartridge based on authentication of the toner refill cartridge capable of refilling toner several times, will be described.

Figure 4:
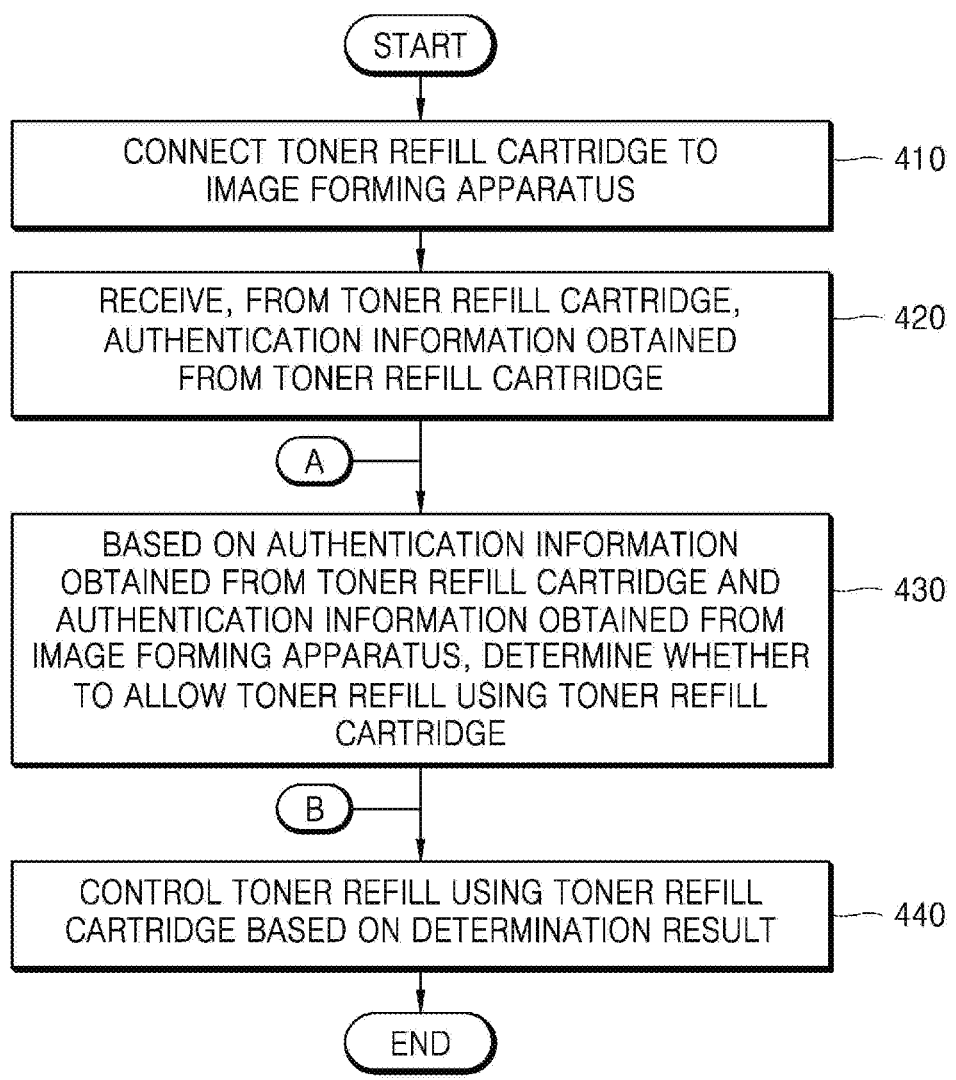
FIG. 4 is a flowchart of a toner refill method using a toner refill cartridge, according to an example.

FIG. 4 is a flowchart of a toner refill method using a toner refill cartridge, according to an example.

Referring to FIG. 4, the toner refill cartridge 9 may be connected to the image forming apparatus 1000 in operation 410.

When the toner refill cartridge 9 is initially connected to the image forming apparatus 1000, after genuine product authentication of the toner refill cartridge 9 is performed, authentication information to be used to determine whether to allow repeated toner refills of the toner refill cartridge 9 may be received from the toner refill cartridge 9 and may be stored in the image forming apparatus 1000. For example, when the toner refill cartridge 9 is initially connected to the image forming apparatus 1000, genuine product authentication is performed based on product identification information of the toner refill cartridge 9. For example, when the toner refill cartridge 9 is initially connected to the image forming apparatus 1000, genuine product authentication may be performed based on product identification information of the toner refill cartridge 9. After the genuine product authentication is completed based on the product identification information of the toner refill cartridge 9, the image forming apparatus 1000 may receive, from the toner refill cartridge 9, authentication information obtained from the toner refill cartridge 9 and may store the received authentication information in a specific storage space of the image forming apparatus 1000. Accordingly, the toner refill cartridge 9 and the image forming apparatus 1000 are synchronized with each other based on the authentication information, and the image forming apparatus 1000 may refill the toner by using only the synchronized toner refill cartridge 9. When the toner refill cartridge 9 is connected to the image forming apparatus 1000, operation 420 may be performed.

In operation 420, the image forming apparatus 1000 may receive, from the toner refill cartridge 9 connected to the image forming apparatus 1000, the authentication information obtained from the toner refill cartridge 9.

In operation 430, the image forming apparatus 1000 may determine whether to allow the toner refill using the toner refill cartridge 9 connected to the image forming apparatus 1000 based on authentication information obtained from the image forming apparatus 1000 and the authentication information obtained from the toner refill cartridge 9 and received by the image forming apparatus 1000.

Each of the authentication information obtained from the toner refill cartridge 9 and the authentication information obtained from the image forming apparatus 1000 may be identification information based on an authentication key generated based on at least one of product identification information of the toner refill cartridge 9 or identification information of a toner provider. The product identification information of the toner refill cartridge 9 may be a toner provider ID, a serial number, a model name, information regarding a manufacturer, information regarding a manufacturing date, and the like. The identification information of the toner provider may be the toner provider ID, unique information assigned to the toner provider, and the like. The toner provider may collectively refer to a person who sells the toner refill cartridge 9 and may include a reseller. For example, each of the authentication information obtained from the toner refill cartridge 9 and the authentication information obtained from the image forming apparatus 1000 may be identification information based on an authentication key generated based on a serial number of the toner refill cartridge 9. Each of the authentication information obtained from the toner refill cartridge 9 and the authentication information obtained from the image forming apparatus 1000 may be identification information based on an authentication key generated based on the toner provider ID. Each of the authentication information obtained from the toner refill cartridge 9 and the authentication information obtained from the image forming apparatus 1000 may be identification information based on an authentication key generated based on the serial number and the toner provider ID. Each of the authentication information obtained from the toner refill cartridge 9 and the authentication information obtained from the image forming apparatus 1000 may be identification information based on an authentication key generated based on various combinations of the product identification information of the toner refill cartridge 9 and the identification information of the toner provider.

Figure 5:
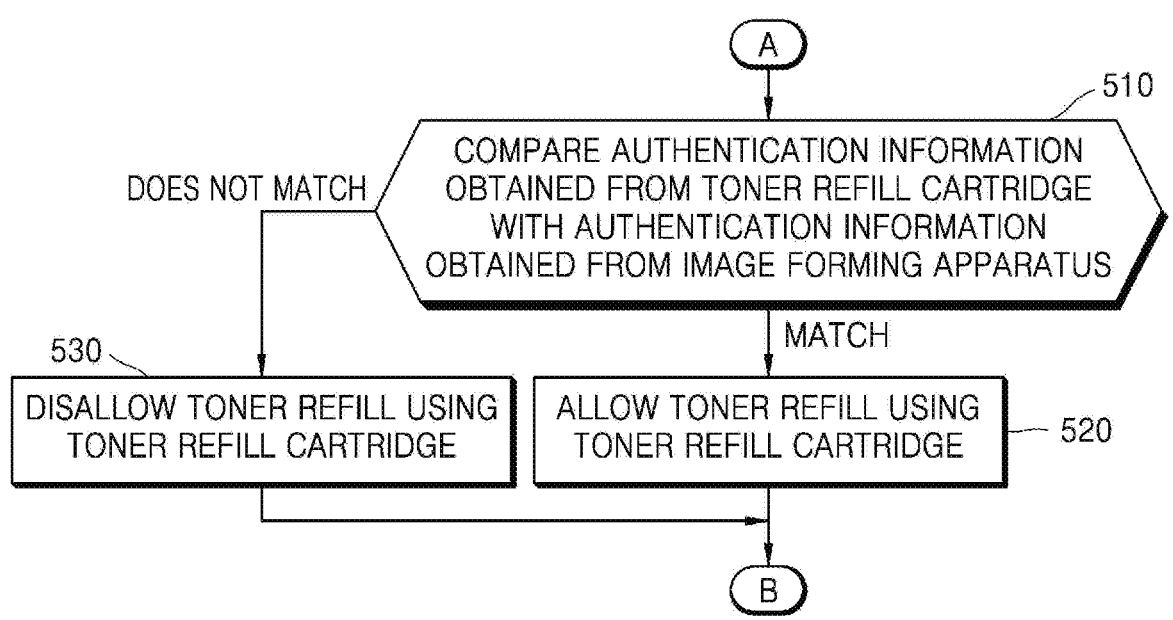
FIG. 5 is a flowchart of an operation of determining whether to allow a toner refill in a toner refill method using a toner refill cartridge, according to an example.

FIG. 5 is a flowchart of an operation of determining whether to allow a toner refill in a toner refill method using a toner refill cartridge, according to an example.

Referring to FIG. 5, the image forming apparatus 1000 may compare the authentication information obtained from the toner refill cartridge 9 with the authentication information obtained from the image forming apparatus 1000 in operation 510. When the toner refill cartridge 9 is initially connected to the image forming apparatus 1000, the image forming apparatus 1000 may receive, from the toner refill cartridge 9, the authentication information obtained from the toner refill cartridge 9 and store the received authentication information in a specific storage space of the image forming apparatus 1000. Thus, the toner refill cartridge 9 and the image forming apparatus 1000 may be synchronized with each other based on the authentication information. In order to determine whether a toner refill cartridge is the synchronized toner refill cartridge 9, the image forming apparatus 1000 may receive, from the toner refill cartridge 9 connected to the image forming apparatus 1000, the authentication information obtained from the toner refill cartridge 9 and may compare the received authentication information with the authentication information stored in the image forming apparatus 1000. The image forming apparatus 1000 may determine whether the authentication information obtained from the toner refill cartridge 9 matches with the authentication information obtained from the image forming apparatus 1000.

As a result of the determination, the image forming apparatus 1000 may determine whether to allow the toner refill using the toner refill cartridge 9 connected to the image forming apparatus 1000. In operation 520, when the authentication information obtained from the toner refill cartridge 9 matches with the authentication information obtained from the image forming apparatus 1000, the image forming apparatus 1000 may allow the toner refill using the toner refill cartridge 9 connected to the image forming apparatus 1000. In operation 530, when the authentication information obtained from the toner refill cartridge 9 does not match with the authentication information obtained from the image forming apparatus 1000, the image forming apparatus 1000 may not allow the toner refill using the toner refill cartridge 9 connected to the image forming apparatus 1000.

Referring back to FIG. 4, in operation 440, the image forming apparatus 1000 may control the toner refill using the toner refill cartridge 9 according to a determination result.

When the toner refill is allowed, the image forming apparatus 1000 may control the toner refilling portion 10 to perform the toner refill using the toner refill cartridge 9, and when the toner refill is not allowed, the image forming apparatus 1000 may control the toner refilling portion 10 not to perform the toner refill using the toner refill cartridge 9

Hereinafter, FIGS. 6 to 12 show examples of operations of determining whether to allow the toner refill using the toner refill cartridge 9 connected to the image forming apparatus 1000.

Figure 6:
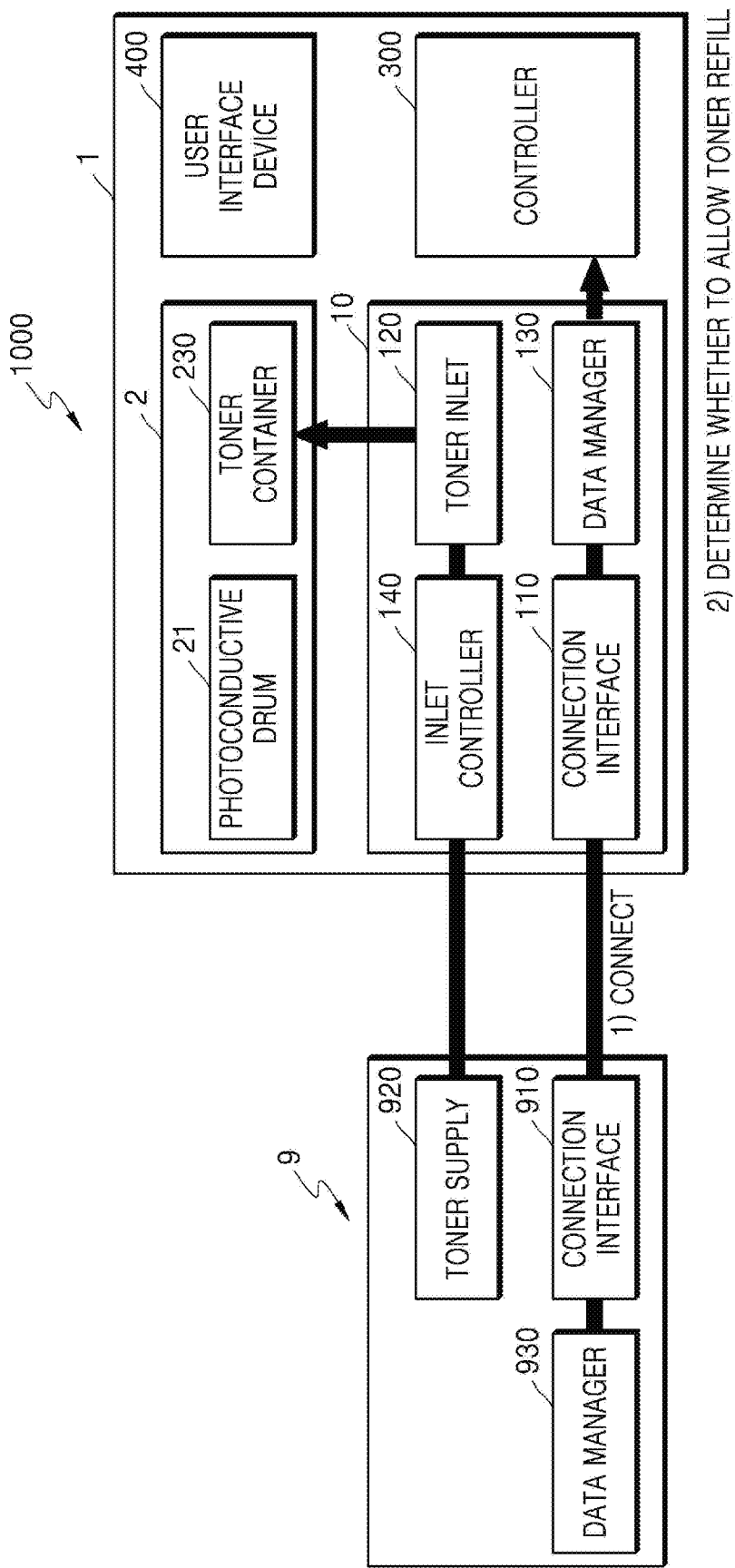
FIGS. 6 and 7 respectively are a block diagram and a flowchart for explaining whether to allow a toner refill by using a toner refill cartridge connected to an image forming apparatus, according to an example.
Figure 7:
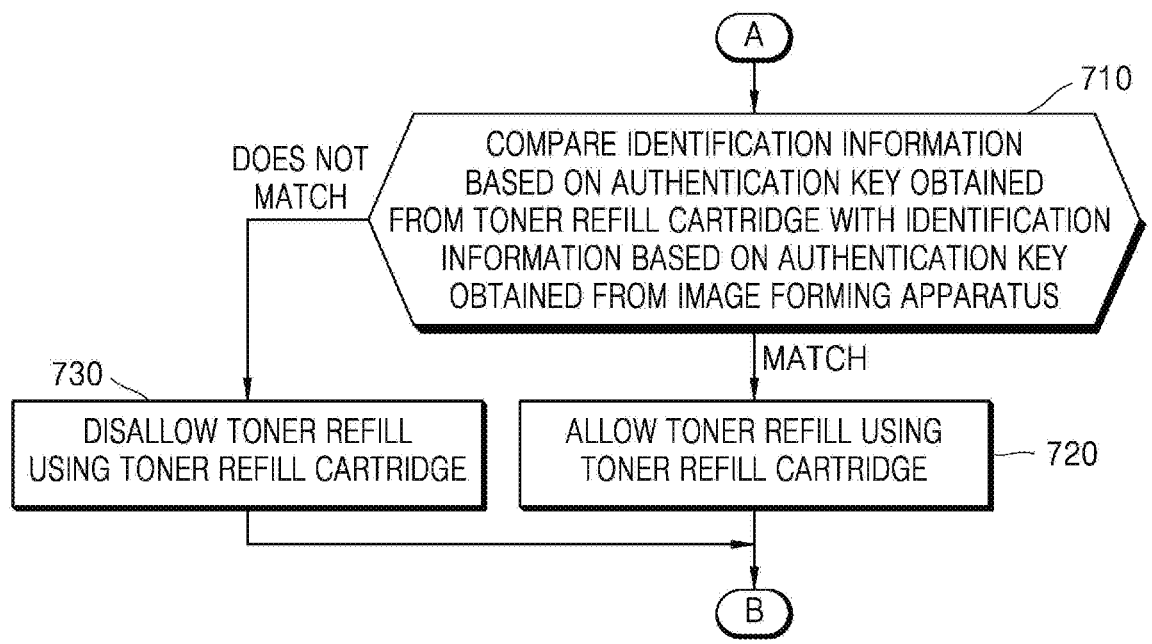

FIGS. 6 and 7 respectively are a block diagram and a flowchart for explaining whether to allow a toner refill using a toner refill cartridge connected to an image forming apparatus, according to an example.

FIG. 6 shows a structure of each of the image forming apparatus 1000 and the toner refill cartridge 9 and an operation when the image forming apparatus 1000 and the toner refill cartridge 9 are connected to each other. The structures shown in FIG. 6 are merely examples for explanation, and the disclosure is not limited thereto. The image forming apparatus 1000 and the toner refill cartridge 9 may further include general-purpose components.

The image forming apparatus 1000 may include the development cartridge 2, the toner refilling portion 10, a controller 300, and a user interface device 400 in the main body 1.

The development cartridge 2 may be mounted on the main body 1 and may include the toner container 230 containing toner and the photoconductive drum 21 generating a toner image on an electrostatic latent image by receiving the toner.

The toner refilling portion 10 may be connected to the development cartridge 2 and to the toner refill cartridge 9 inserted through the communicating portion 8 of the main body 1, thereby functioning as an interface between the toner refill cartridge 9 and the development cartridge 2. The toner refilling portion 10 may include a connection interface 110, a toner inlet 120, a data manager 130, an inlet controller 140, and the like. When the toner refill cartridge 9 is connected to the image forming apparatus 1000, the connection interface 110 may receive/transmit data from/to a connection interface 910 of the toner refill cartridge 9. The data manager 130 may store and manage data used during the toner refill using the toner refill cartridge 9 and may include a circuit that controls operations performed during the connection of the toner refill cartridge 9 and the toner refill. For example, the data manager 130 may perform an operation such as storing and managing data used for authentication or decrypting encrypted data that is received from the toner refill cartridge 9. A memory of the data manager 130 may store therein the identification information based on the authentication key generated based on at least one of the product identification information of the toner refill cartridge 9 and the identification information of the toner provider.

After genuine product authentication of the toner refill cartridge 9 is performed when the toner refill cartridge 9 is initially connected to the image forming apparatus 1000, the authentication information to be used to determine whether to allow repeated toner refills of the toner refill cartridge 9 may be received from the toner refill cartridge 9 and may be stored in the image forming apparatus 1000. For example, after the genuine product authentication is performed based on product identification information of the toner refill cartridge 9 when the toner refill cartridge 9 is initially connected to the image forming apparatus 1000, the identification information based on the authentication key may be received from the toner refill cartridge 9 and stored in the image forming apparatus 1000. The data manager 130 may be realized as a chip including a processor and a memory, an integrated chip, a printed circuit board, or the like. The inlet controller 140 may be a device that opens and closes the toner inlet 120 to adjust a toner inflow from the toner refill cartridge 9. For example, the inlet controller 140 may include an input shutter and a device to drive the input shutter. The toner inlet 120 may receive the toner from the toner refill cartridge 9 and transfer the toner to the toner container 230 of the development cartridge 2.

The controller 300 may control operations of the image forming apparatus 1000 and may include at least one processor. The controller 300 may control other components included in the image forming apparatus 1000. The controller 300 may include at least one specialized processor corresponding to each function or may be an integrated processor. Alternatively, the controller 300 may include a non-volatile memory and may execute programs stored in a memory, read data stored in the memory, or store new data in the memory. In the non-volatile memory of the controller 300, authentication information used to authenticate the toner refill cartridge 9 may be stored.

The user interface device 400 may include an input device for receiving an input for performing an image forming job and an output device for displaying information such as a result of the image forming job or a state of the image forming apparatus 1000.

The toner refill cartridge 9 may include the connection interface 910, a toner supply 920, and a data manager 930.

When the toner refill cartridge 9 is connected to the image forming apparatus 1000, the connection interface 910 may receive/transmit data from/to the connection interface 110 of the image forming apparatus 1000.

The toner supply 920 may contain toner to be refilled in the image forming apparatus 1000, and after the toner refill cartridge 9 is authenticated, the toner supply 920 may supply the toner to the image forming apparatus 1000. For example, when the authentication of the toner refill cartridge 9 is completed after the toner refill cartridge 9 is mounted on the toner refilling portion 10 of the image forming apparatus 1000, a discharge shutter corresponding to the input shutter of the toner inlet 120 is at an open position, and thus the toner supply 920 may supply the toner to the toner inlet 120.

The data manager 930 may store and manage data used during the toner refill using the toner refill cartridge 9 and may include a circuit that controls some operations performed during the connection of the toner refill cartridge 9 and the toner refill. For example, the data manager 930 may include a module that may store and manage the authentication information of the toner refill cartridge 9 or may perform data encryption and/or a communication with the image forming apparatus 1000. A memory of the data manager 930 may store therein the product identification information of the toner refill cartridge 9, for example, a serial number, a model name, information regarding a manufacturer, information regarding a manufacturing date, and/or the identification information of the toner provider, for example, a toner provider ID, and unique information provided to the toner provider. The memory of the data manager 930 may store therein the identification information based on an authentication key generated based on at least one of the product identification information of the toner refill cartridge 9 and the identification information of the toner provider. The memory of the data manager 930 may store therein various programs, information regarding a use state (e.g., a remaining amount of the toner, etc.), lifespan information of the toner refill cartridge 9, etc. The data manager

930 may be realized as a chip including a processor and a memory, an integrated chip, a printed circuit board, or the like.

FIG. 6 shows an operation of determining whether the image forming apparatus 1000 allows the toner refill using the toner refill cartridge 9 after the image forming apparatus 1000 and the toner refill cartridge 9 are connected to each other, according to operations of the above components.

The toner refilling portion 10 of the image forming apparatus 1000 is connected to the development cartridge 2 and the toner refill cartridge 9 inserted through the communicating portion 8 of the main body 1, and thus, the toner refilling portion 10 may receive, from the toner refill cartridge 9 connected to the image forming apparatus 1000, the authentication information obtained from the toner refill cartridge 9. The authentication information obtained from the data manager 930 of the toner refill cartridge 9 may be transmitted to the data manager 130 or the controller 300 of the image forming apparatus 1000, through the connection interface 910 of the toner refill cartridge 9 and the connection interface 110 of the image forming apparatus 1000.

The controller 300 may determine whether to allow the toner refill using the toner refill cartridge 9 connected to the image forming apparatus 1000, based on the authentication information received and obtained from the toner refill cartridge 9 and the authentication information obtained from the image forming apparatus 1000. The controller 300 may compare the authentication information received and obtained from the toner refill cartridge 9 with the authentication information obtained from the image forming apparatus 1000, and as a result of the comparison, the controller 300 may determine whether to allow the toner refill using the toner refill cartridge 9 connected to the image forming apparatus 1000, according to whether the authentication information obtained from the toner refill cartridge 9 matches with the authentication information obtained from the image forming apparatus 1000.

FIG. 7 is an example of determining whether the image forming apparatus 1000 allows the toner refill using the toner refill cartridge 9 when each of the authentication information obtained from the toner refill cartridge 9 and the authentication information obtained from the image forming apparatus 1000 is the identification information based on the authentication key generated based on the product identification information of the toner refill cartridge 9. The image forming apparatus 1000 may determine whether to allow the toner refill, according to whether identification information based on an authentication key obtained from the toner refill cartridge 9 matches with identification information based on an authentication key obtained from the image forming apparatus 1000.

In operation 710, the image forming apparatus 1000 may compare the identification information based on the authentication key obtained and received from the toner refill cartridge 9 with the identification information based on the authentication key obtained from the image forming apparatus 1000. When the toner refill cartridge 9 has been connected to the image forming apparatus 1000, and when the toner refill cartridge 9 is initially connected to the image forming apparatus 1000, because the image forming apparatus 1000 receives the identification information based on the authentication key which is received and obtained from the toner refill cartridge 9 and stores the same in a specific storage space of the image forming apparatus 1000, the image forming apparatus 1000 and the toner refill cartridge 9 may be synchronized with each other based on the identification information based on the authentication key.

In order to determine whether a toner refill cartridge is the synchronized toner refill cartridge 9, the image forming apparatus 1000 may receive, from the toner refill cartridge 9 connected to the image forming apparatus 1000, the identification information based on the authentication key obtained from the toner refill cartridge 9 and may compare the received identification information with the identification information based on the authentication key that is stored in the image forming apparatus 1000. The image forming apparatus 1000 may determine whether the identification information based on the authentication key obtained from the toner refill cartridge 9 matches with the identification information based on the authentication key obtained from the image forming apparatus 1000.

In operation 720, the image forming apparatus 1000 may allow the toner refill using the toner refill cartridge 9 connected to the image forming apparatus 1000 when the identification information based on the authentication key obtained from the toner refill cartridge 9 matches with the identification information based on the authentication key obtained from the image forming apparatus 1000.

In operation 730, the image forming apparatus 1000 may not allow the toner refill using the toner refill cartridge 9 connected to the image forming apparatus 1000 when the identification information based on the authentication key obtained from the toner refill cartridge 9 does not match with the identification information based on the authentication key obtained from the image forming apparatus 1000.

Referring back to FIG. 6, according to a determination result, the controller 300 may control the toner refilling portion 10. The toner refilling portion 10 may adjust a toner inflow to the development cartridge 2 from the toner refill cartridge 9 and may perform the toner refill in response to control signals of the controller 300.

Figure 8:
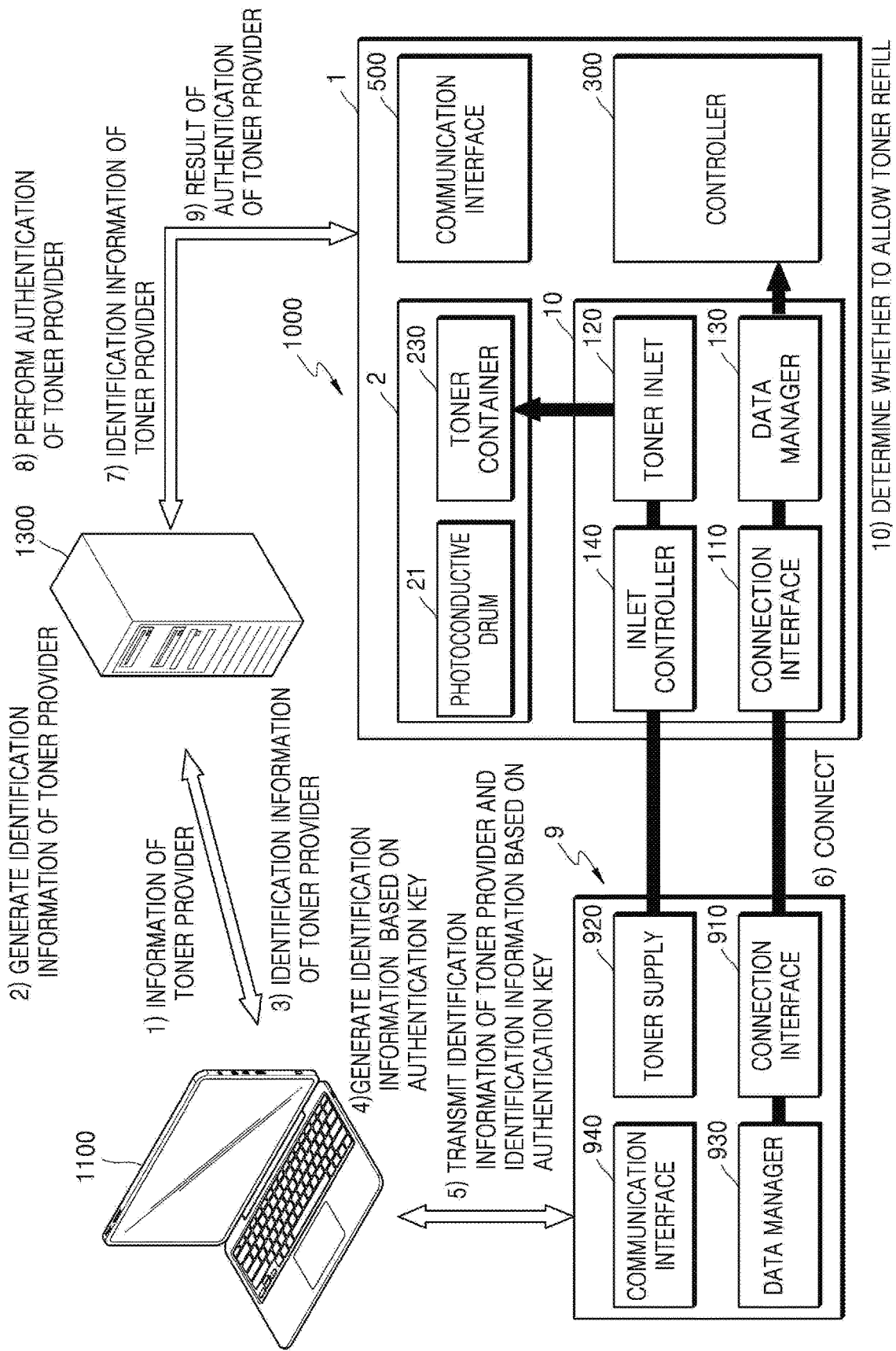
FIGS. 8 and 9 respectively are a block diagram and a flowchart for explaining an operation of determining whether to allow a toner refill by using a toner refill cartridge connected to an image forming apparatus, according to an example.
Figure 9:
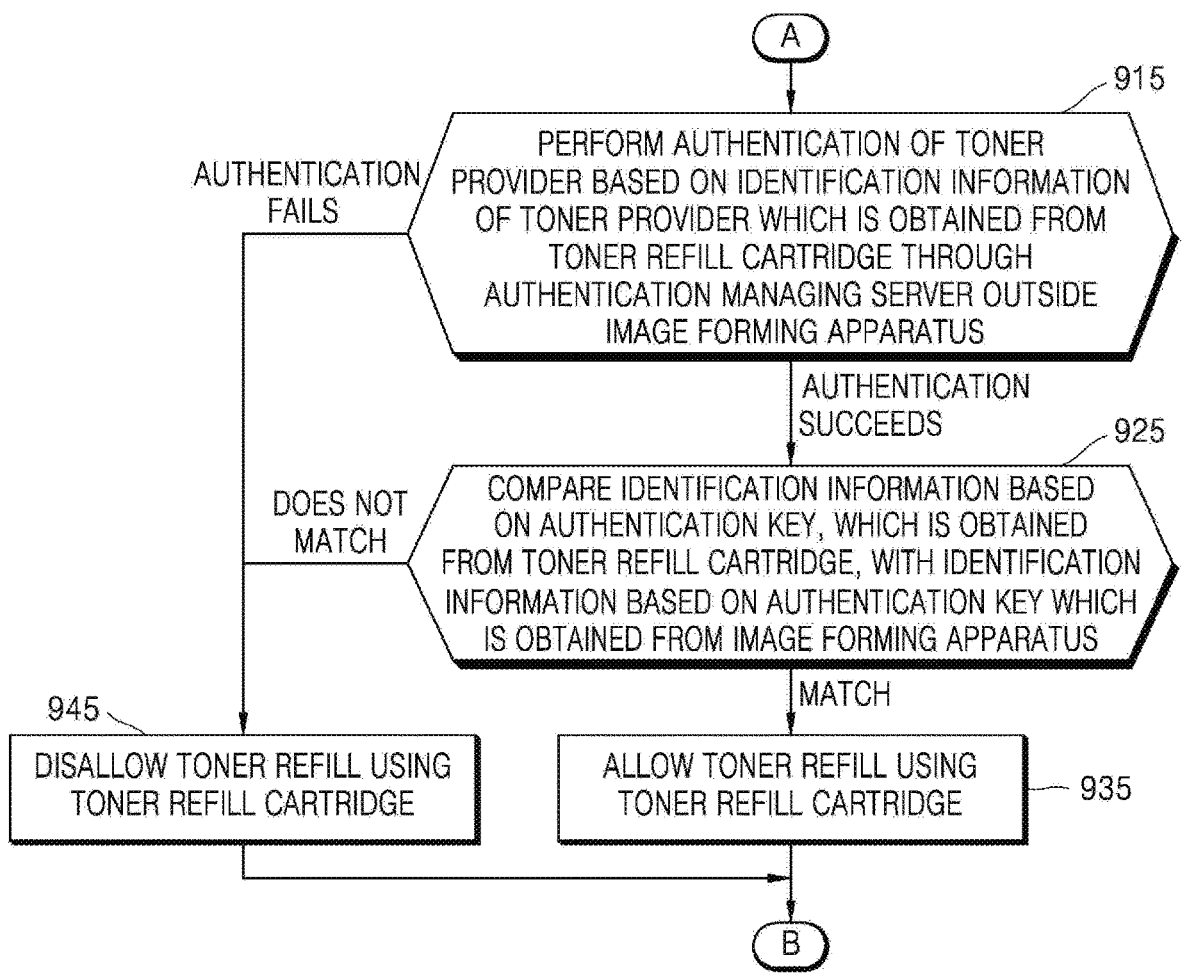

FIGS. 8 and 9 respectively are a block diagram and a flowchart for explaining an operation of determining whether to allow a toner refill by using a toner refill cartridge connected to an image forming apparatus, according to an example. Descriptions of like elements will be omitted, and repeated descriptions will be omitted as well.

Referring to FIGS. 8 and 9, the toner refill cartridge 9 and the image forming apparatus 1000 may communicate with a host device 1100 and an authentication managing server 1300 and determine whether to allow the toner refill using the toner refill cartridge 9.

The host device 1100 may be an electronic device enabling communication that an administrator such as the toner provider uses. Examples of the host device 1100 include a laptop, a smart phone, and the like. In the host device 1100, a program to manage the toner refill cartridge 9 may be installed. The host device 1100 may communicate with the authentication managing server 1300, may transmit toner provider information to the authentication managing server 1300, and may receive identification information of the toner provider, which is generated by the authentication managing server 1300. The host device 1100 may generate the identification information based on an authentication key which is generated based on at least one of the product identification information of the toner refill cartridge 9 and the identification information of the toner provider. The host device 1100 may transmit, to the toner refill cartridge 9, the identification information of the toner provider and the identification information based on the authentication key through a communication interface 940 of the toner refill cartridge 9.

When there is a request from the image forming apparatus 1000 or the host device 1100, the authentication managing server 1300 may support a certain service by providing a response to the request. The authentication managing server 1300 may store therein information regarding a service provided by the authentication managing server 1300 or information received from an external device. The authentication managing server 1300 may include at least one processing unit. The authentication managing server 1300 may include a corresponding communication module that may communicate with the image forming apparatus 1000, the host device 1100, and the like. The authentication managing server 1300 may receive the toner provider information from the host device 1100, may generate the identification information of the toner provider based on the toner provider information, and may transmit, to the host device 1100, the generated identification information of the toner provider after registering the same to the authentication managing server 1300. The authentication managing server 1300 may perform toner provider authentication by determining whether the identification information of the toner provider, which is transmitted from the image forming apparatus 1000, matches with the identification information of the toner provider, which is registered to the authentication managing server 1300. The authentication managing server 1300 may transmit, to the image forming apparatus 1000, a toner provider authentication result through a communication interface 500 of the image forming apparatus 1000.

Referring to FIG. 8, before the image forming apparatus 1000 is connected to the toner refill cartridge 9, the host device 1100 may obtain the identification information of the toner provider through the authentication managing server 1300 and may generate the identification information based on the authentication key. The host device 1100 may transmit, to the toner refill cartridge 9, the identification information of the toner provider and the identification information based on the authentication key, and the toner refill cartridge 9 may store, in the data manager 930, the identification information of the toner provider and the identification information based on the authentication key. After the image forming apparatus 1000 is connected to the toner refill cartridge 9, the image forming apparatus 1000 may receive the authentication information obtained from the toner refill cartridge 9. The image forming apparatus 1000 may receive, from the toner refill cartridge 9, the identification information of the toner provider and the identification information based on the authentication key, which are stored in the data manager 930 of the toner refill cartridge 9.

The controller 300 of the image forming apparatus 1000 may transmit the identification information of the toner provider to the authentication managing server 1300 through the communication interface 500 and thus may perform the toner provider authentication using the identification information of the toner provider which is obtained from the toner refill cartridge 9 through the authentication managing server 1300 external to the image forming apparatus 1000. The controller 300 of the image forming apparatus 1000 may receive, from the authentication managing server 1300, the toner provider authentication result through the communication interface 500.

When the toner provider authentication succeeds, the controller 300 of the image forming apparatus 1000 may compare the identification information based on the authentication key, which is received and obtained from the toner refill cartridge 9, with the identification information based on the authentication key obtained from the image forming apparatus 1000. As a result of the comparison, the controller 300 of the image forming apparatus 1000 may determine whether to allow the toner refill using the toner refill cartridge 9 according to whether the identification information based on the authentication key obtained from the toner refill cartridge 9 matches with the identification information based on the authentication key obtained from the image forming apparatus 1000.

FIG. 9 shows an example of determining whether the image forming apparatus 1000 allows the toner refill using the toner refill cartridge 9 when each of the authentication information obtained from the toner refill cartridge 9 and the authentication information obtained from the image forming apparatus 1000 is the identification information based on the authentication key generated based on at least one of the product identification information of the toner refill cartridge 9 and the identification information of the toner provider. After the toner provider authentication is performed based on the identification information of the toner provider, the image forming apparatus 1000 may determine whether to allow the toner refill according to whether the identification information based on the authentication key obtained from the toner refill cartridge 9 matches with the identification information based on the authentication key obtained from the image forming apparatus 1000.

In operation 915, the image forming apparatus 1000 may perform the toner provider authentication using the identification information of the toner provider which is obtained from the toner refill cartridge 9 through the authentication managing server 1300 external to the image forming apparatus 1000. When the toner provider authentication fails, the image forming apparatus 1000 does not allow the toner refill, and when the toner provider authentication succeeds, operation 925 may be performed.

In operation 925, the image forming apparatus 1000 may compare the identification information based on the authentication key, which is received and obtained from the toner refill cartridge 9, with the identification information based on the authentication key obtained from the image forming apparatus 1000. In order to determine whether a toner refill cartridge is the synchronized toner refill cartridge 9, the image forming apparatus 1000 may determine whether the identification information based on the authentication key obtained from the toner refill cartridge 9 matches with the identification information based on the authentication key obtained from the image forming apparatus 1000.

In operation 935, the image forming apparatus 1000 may allow the toner refill using the toner refill cartridge 9 connected to the image forming apparatus 1000 when the identification information based on the authentication key obtained from the toner refill cartridge 9 matches with the identification information based on the authentication key obtained from the image forming apparatus 1000.

In operation 945, the image forming apparatus 1000 may not allow the toner refill using the toner refill cartridge 9 connected to the image forming apparatus 1000 when the identification information based on the authentication key obtained from the toner refill cartridge 9 does not match with the identification information based on the authentication key obtained from the image forming apparatus 1000.

Figure 10:
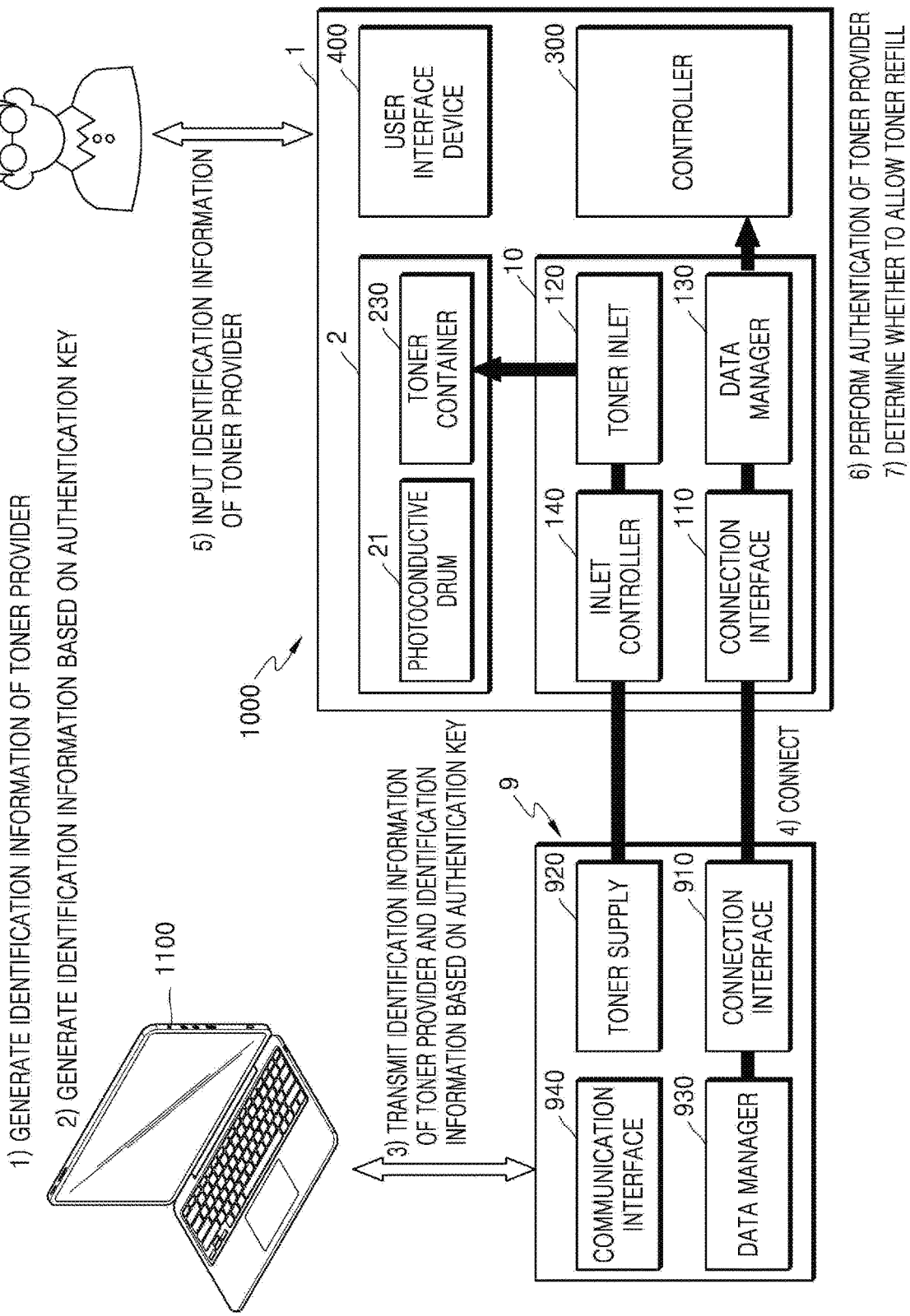
FIGS. 10 and 11 respectively are a block diagram and a flowchart for explaining an operation of determining whether to allow a toner refill by using a toner refill cartridge connected to an image forming apparatus, according to an example.
Figure 11:
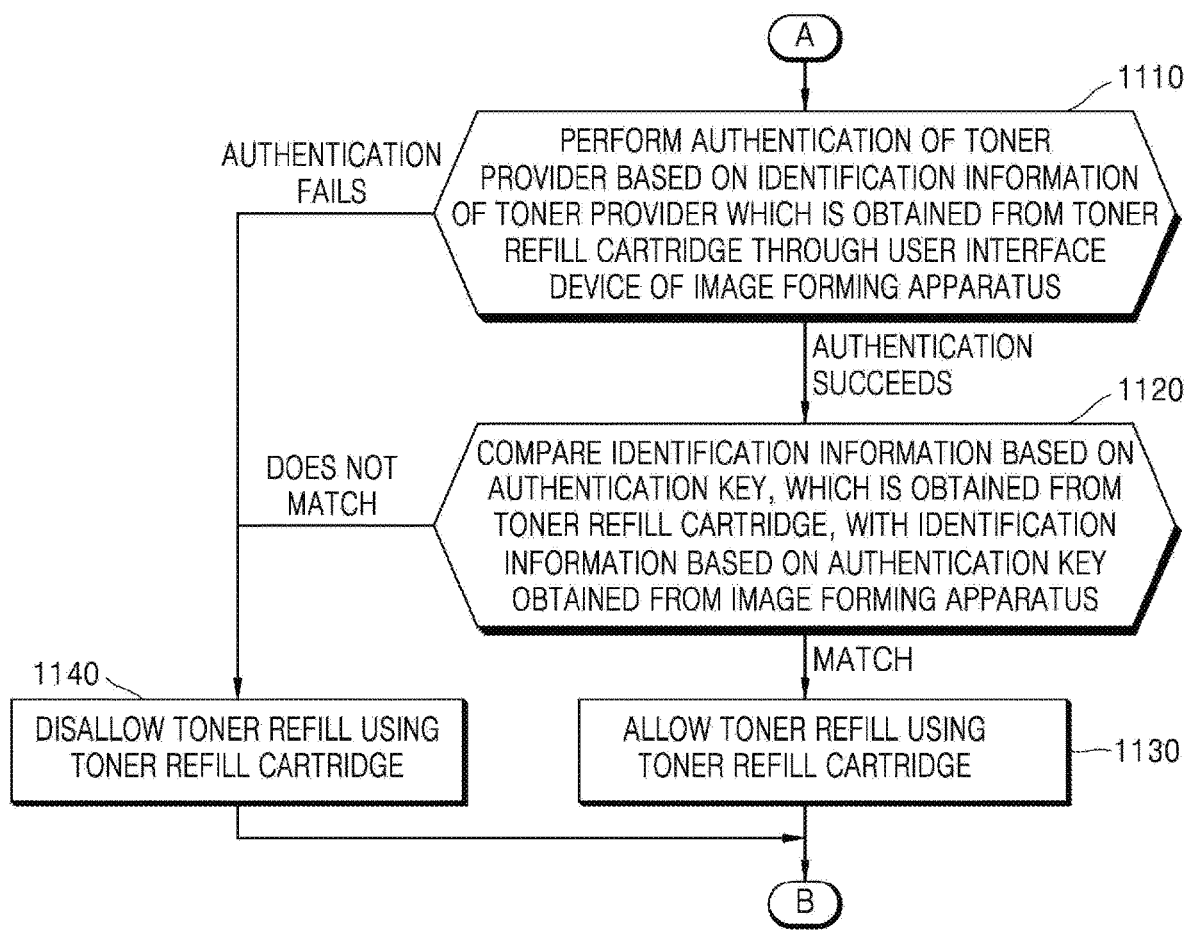

FIGS. 10 and 11 respectively are a block diagram and a flowchart for explaining an operation of determining whether to allow a toner refill by using a toner refill cartridge connected to an image forming apparatus, according to an example. Descriptions of like elements will be omitted, and repeated descriptions will be omitted as well.

Referring to FIGS. 10 and 11, the image forming apparatus 1000 does not use the authentication managing server 1300 and performs the toner provider authentication by receiving the identification information of the toner provider from the toner provider through the user interface device 400 of the image forming apparatus 1000.

The host device 1100 may generate the identification information of the toner provider and may generate the identification information based on the authentication key generated based on at least one of the product identification information of the toner refill cartridge 9 and the identification information of the toner provider. The host device 1100 may transmit, to the toner refill cartridge 9, the identification information of the toner provider and the identification information based on the authentication key through the communication interface 940 of toner refill cartridge 9.

Referring to FIG. 10, before the image forming apparatus 1000 is connected to the toner refill cartridge 9, the host device 1100 may generate the identification information of the toner provider and the identification information based on the authentication key and transmit the same to the toner refill cartridge 9. Thus, the toner refill cartridge 9 may store the identification information of the toner provider and the identification information based on the authentication key in the data manager 930. After the image forming apparatus 1000 is connected to the toner refill cartridge 9, the image forming apparatus 1000 may receive the authentication information obtained from the toner refill cartridge 9. The image forming apparatus 1000 may receive, from the toner refill cartridge 9, the identification information of the toner provider and the identification information based on the authentication key, which are stored in the data manager 930 of the toner refill cartridge 9.

The controller 300 of the image forming apparatus 1000 may receive the identification information of the toner provider from the toner provider through the user interface device 400 of the image forming apparatus 1000 and thus may perform the toner provider authentication using the identification information of the toner provider obtained from the toner refill cartridge 9, through the user interface device 400.

When the toner provider authentication succeeds, the controller 300 of the image forming apparatus 1000 may compare the identification information based on the authentication key, which is received and obtained from the toner refill cartridge 9, with the identification information based on the authentication key obtained from the image forming apparatus 1000. As a result of the comparison, the controller 300 of the image forming apparatus 1000 may determine whether to allow the toner refill using the toner refill cartridge 9 according to whether the identification information based on the authentication key obtained from the toner refill cartridge 9 matches with the identification information based on the authentication key obtained from the image forming apparatus 1000.

FIG. 11 shows an example of determining whether the image forming apparatus 1000 allows the toner refill using the toner refill cartridge 9 when each of the authentication information obtained from the toner refill cartridge 9 and the authentication information obtained from the image forming apparatus 1000 is the identification information based on the authentication key generated based on at least one of the product identification information of the toner refill cartridge 9 and the identification information of the toner provider. After the toner provider authentication is performed based on the identification information of the toner provider, the image forming apparatus 1000 may determine whether to allow the toner refill according to whether the identification information based on the authentication key obtained from the toner refill cartridge 9 matches with the identification information based on the authentication key obtained from the image forming apparatus 1000.

In operation 1110, the image forming apparatus 1000 may perform the toner provider authentication using the identification information of the toner provider which is obtained from the toner refill cartridge 9 through the user interface device 400 of the image forming apparatus 1000. Unlike the above example, the identification information of the toner provider may be obtained from the toner provider by using the user interface device 400 of the image forming apparatus 1000 instead of using the authentication managing server 1300 external to the image forming apparatus 1000. When the toner provider authentication fails, the image forming apparatus 1000 does not allow the toner refill, and when the toner provider authentication succeeds, operation 1120 may be performed.

In operation 1120, the image forming apparatus 1000 may compare the identification information based on the authentication key, which is received and obtained from the toner refill cartridge 9, with the identification information based on the authentication key obtained from the image forming apparatus 1000.

In operation 1130, when the identification information based on the authentication key obtained from the toner refill cartridge 9 matches with the identification information based on the authentication key obtained from the image forming apparatus 1000, the image forming apparatus 1000 may allow the toner refill using the toner refill cartridge 9 connected to the image forming apparatus 1000.

In operation 1140, when the identification information based on the authentication key obtained from the toner refill cartridge 9 does not match with the identification information based on the authentication key obtained from the image forming apparatus 1000, the image forming apparatus 1000 may not allow the toner refill using the toner refill cartridge 9 connected to the image forming apparatus 1000.

Figure 12:
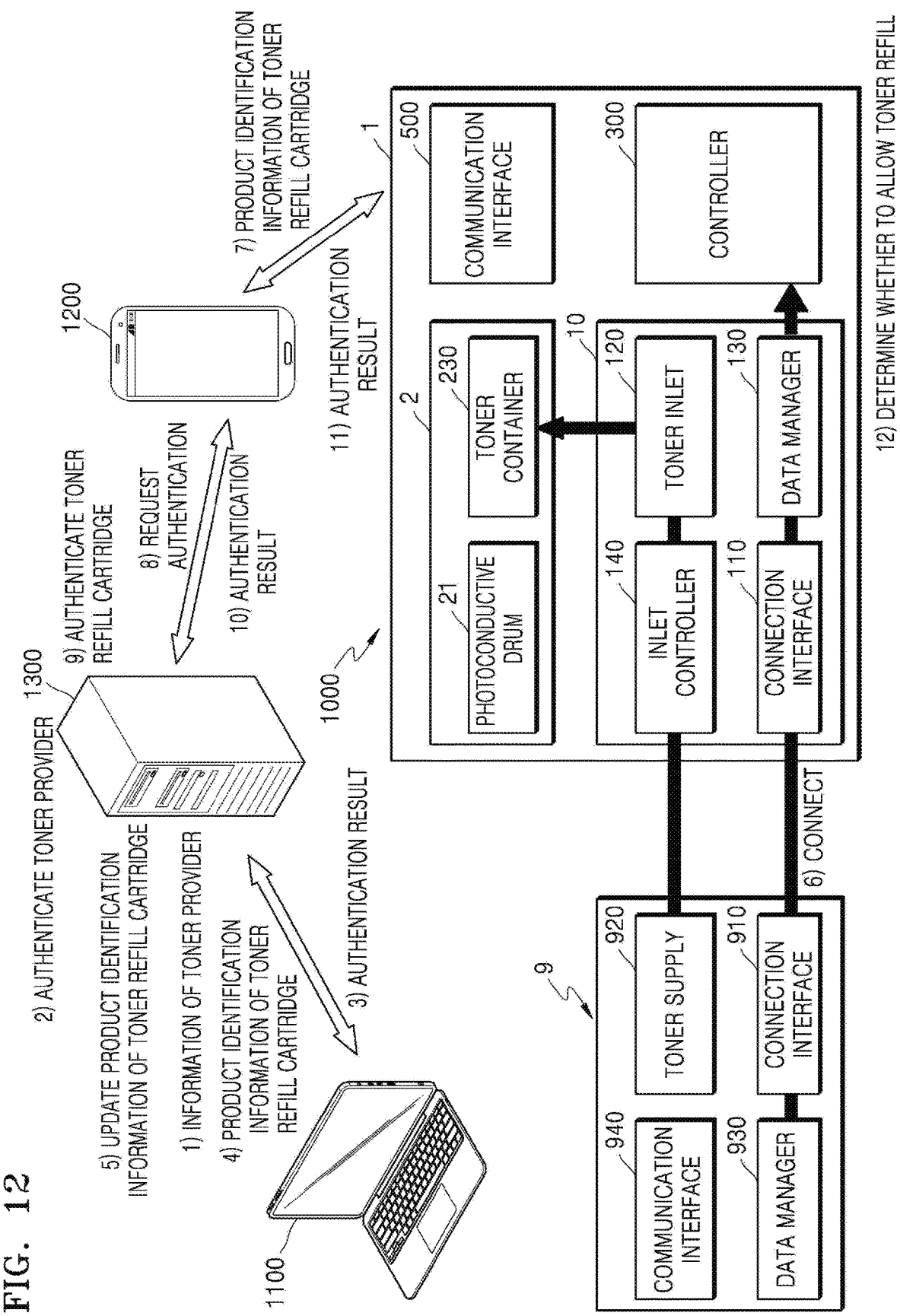
FIG. 12 is a diagram for explaining an operation of determining whether to allow a toner refill in a toner refill method using a toner refill cartridge according to an example.

FIG. 12 is a diagram for explaining an operation of determining whether to allow a toner refill in a toner refill method using a toner refill cartridge according to an example.

Referring to FIG. 12, the host device 1100 may not generate the identification information based on the authentication key before the image forming apparatus 1000 is connected to the toner refill cartridge 9, and after the image forming apparatus 1000 is connected to the toner refill cartridge 9, the image forming apparatus 1000 may perform authentication of the toner refill cartridge 9 based on the product identification information of the toner refill cartridge 9, by using an application installed on a mobile device 1200 communicating with the image forming apparatus 1000. The mobile device 1200 may be an electronic device such as a smart phone, a smart watch, a laptop, etc. and collectively refers to a device capable of communicating with other devices.

Before the image forming apparatus 1000 is connected to the toner refill cartridge 9, the host device 1100 may transmit the toner provider information to the authentication managing server 1300 and complete the toner provider authentication. The host device 1100 may update the product identification information of the toner refill cartridge 9 to the authentication managing server 1300.

After the image forming apparatus 1000 is connected to the toner refill cartridge 9, the image forming apparatus 1000 may transmit the product identification information of the toner refill cartridge 9, which is obtained from the toner refill cartridge 9, to the mobile device 1200 in response to a request from the mobile device 1200 communicating with the authentication managing server 1300 external to the image forming apparatus 1000.

The mobile device 1200 may transmit the product identification information of the toner refill cartridge 9 to the authentication managing server 1300 and an authentication request. The mobile device 1200 may receive an authentication result based on the product identification information of the toner refill cartridge 9 from the authentication managing server 1300, in response to the authentication request. The mobile device 1200 may transmit the received authentication result to the image forming apparatus 1000.

The controller 300 of the image forming apparatus 1000 may determine whether to allow the toner refill according to the authentication result received from the mobile device 1200.

The one or more examples may be embodied as a non-transitory computer-readable recording medium storing instructions or data executable by a computer or a processor, may be written as programs executable by a computer, and may be implemented in a general-use digital computer that executes the programs using a computer-readable recording medium. Examples of the non-transitory computer-readable recording medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, photomagnetic data storage devices, optical data storage devices, hard disks, solid state disks (SSDs), and any device capable of storing instructions or software, relevant data, data files, and data structures, and providing processors or computers with instructions or software, relevant data, data files, and data structures so that the processors or computers can execute the instructions.

What is claimed is:

1. An image forming apparatus comprising:
  a main body on which a development cartridge is mounted;
  a toner refilling portion to connect the development cartridge to a toner refill cartridge inserted through a communicating portion of the main body, to obtain authentication information from the toner refill cartridge, and to adjust a toner inflow from the toner refill cartridge to the development cartridge; and
  a controller to
  perform a toner refill operation using the toner refill cartridge based on the authentication information obtained from the toner refill cartridge matching authentication information obtained from the image forming apparatus,
  wherein the authentication information obtained from the image forming apparatus includes authentication information previously received from the toner refill cartridge during an initial refill operation and stored in the image forming apparatus based on an initial connection by the image forming apparatus to the toner refill cartridge and genuine product authentication of the toner refill cartridge by the image forming apparatus.

2. The image forming apparatus of claim 1, wherein each of the authentication information obtained from the toner refill cartridge and the authentication information obtained from the image forming apparatus comprises identification information based on an authentication key generated based on at least one of product identification information of the toner refill cartridge and or identification information of a toner provider.

3. The image forming apparatus of claim 2, wherein the controller is further to:
  perform toner provider authentication by using the identification information of the toner provider obtained from the toner refill cartridge, through an authentication managing server external to the image forming apparatus;
  compare the identification information based on an authentication key obtained from the toner refill cartridge with identification information based on an authentication key obtained from the image forming apparatus; and
  perform the toner refill operation using the toner refill cartridge according to whether the identification information based on the authentication key obtained from the toner refill cartridge matches with the identification information based on the authentication key obtained from the image forming apparatus.

4. The image forming apparatus of claim 2, wherein the controller is further to:
  perform toner provider authentication by using the identification information of the toner provider which is obtained from the toner refill cartridge, through a user interface device of the image forming apparatus;
  compare identification information based on the authentication key obtained from the toner refill cartridge with identification information based on the authentication key obtained from the image forming apparatus; and
  as a result of the comparison, perform the toner refill operation using the toner refill cartridge according to whether the identification information based on the authentication key obtained from the toner refill cartridge matches with the identification information based on the authentication key obtained from the image forming apparatus.

5. The image forming apparatus of claim 1, wherein the authentication information obtained from the image forming apparatus is stored in one of a data manager of the toner refilling portion or a non-volatile memory of the controller.

6. The image forming apparatus of claim 1, wherein, before the toner refill cartridge is connected to the image forming apparatus, the authentication information obtained from the toner refill cartridge is transmitted to the toner refill cartridge from a host device and stored in the toner refill cartridge.

7. A toner refill method using a toner refill cartridge, the toner refill method comprising:
  connecting a toner refill cartridge to an image forming apparatus through a communicating portion of a main body of the image forming apparatus;
  obtaining authentication information from the toner refill cartridge; and
  performing a toner refill operation using the toner refill cartridge based on the authentication information obtained from the toner refill cartridge matching authentication information obtained from the image forming apparatus, wherein the authentication information obtained from the image forming apparatus includes authentication information previously received from the toner refill cartridge during an initial refill operation and stored in the image forming apparatus based on an initial connection by the image forming apparatus to the toner refill cartridge and genuine product authentication of the toner refill cartridge by the image forming apparatus.

8. The toner refill method of claim 7, wherein each of the authentication information obtained from the toner refill cartridge and the authentication information obtained from the image forming apparatus comprises identification information based on an authentication key generated based on at least one of product identification information of the toner refill cartridge or identification information of a toner provider.

9. The toner refill method of claim 8, wherein the performing of the toner refill operation comprises:
performing toner provider authentication by using the identification information of the toner provider obtained from the toner refill cartridge through an authentication managing server external to the image forming apparatus;
comparing the identification information based on an authentication key obtained from the toner refill cartridge with identification information based on an authentication key obtained from the image forming apparatus; and
as a result of the comparison, performing the toner refill operation using the toner refill cartridge according to whether the identification information based on the authentication key obtained from the toner refill cartridge matches with the identification information based on the authentication key obtained from the image forming apparatus.

10. The toner refill method of claim 8, wherein the performing of the toner refill operation comprises:
performing toner provider authentication by using the identification information of the toner provider which is obtained from the toner refill cartridge through a user interface device of the image forming apparatus;
comparing identification information based on the authentication key obtained from the toner refill cartridge with identification information based on the authentication key obtained from the image forming apparatus; and
as a result of the comparison, performing the toner refill operation using the toner refill cartridge according to whether the identification information based on the authentication key obtained from the toner refill cartridge matches with the identification information based on the authentication key obtained from the image forming apparatus.

11. The toner refill method of claim 7, wherein the authentication information obtained from the image forming apparatus is stored in one of a data manager of a toner refilling portion on which the toner refill cartridge is mounted when the toner refill cartridge is connected to the image forming apparatus or a non-volatile memory of the image forming apparatus.

12. The toner refill method of claim 7, wherein, before the toner refill cartridge is connected to the image forming apparatus, the authentication information obtained from the toner refill cartridge is transmitted to the toner refill cartridge from a host device and stored in the toner refill cartridge.

13. A non-transitory computer-readable recording medium having recorded thereon instructions executable by a processor, the non-transitory computer-readable recording medium comprising:
instructions for connecting a toner refill cartridge to an image forming apparatus through a communicating portion of a main body of the image forming apparatus;
instructions for obtaining authentication information from the toner refill cartridge; and
instructions for performing a toner refill operation using the toner refill cartridge based on authentication information obtained from the toner refill cartridge matching authentication information obtained from the image forming apparatus, wherein the authentication information obtained from the image forming apparatus comprises authentication information previously received from the toner refill cartridge during an initial refill operation and stored in the image forming apparatus based on an initial connection by the image forming apparatus to the toner refill cartridge and genuine product authentication of the toner refill cartridge by the image forming apparatus.

14. The non-transitory computer-readable recording medium of claim 13, wherein each of the authentication information obtained from the toner refill cartridge and the authentication information obtained from the image forming apparatus comprises identification information based on an authentication key generated based on at least one of product identification information of the toner refill cartridge or identification information of a toner provider.

15. The non-transitory computer-readable recording medium of claim 14, wherein the instructions for performing the toner refill operation comprise:
instructions for performing toner provider authentication by using the identification information of the toner provider obtained from the toner refill cartridge through an authentication managing server external to the image forming apparatus;
instructions for comparing the identification information based on an authentication key obtained from the toner refill cartridge with identification information based on an authentication key obtained from the image forming apparatus; and
instructions for, as a result of the comparison, performing the toner refill operation using the toner refill cartridge according to whether the identification information based on the authentication key obtained from the toner refill cartridge matches with the identification information based on the authentication key obtained from the image forming apparatus.

16. The non-transitory computer-readable recording medium of claim 14, wherein the instructions for performing the toner refill operation comprise:
instructions for performing toner provider authentication by using the identification information of the toner provider which is obtained from the toner refill cartridge through a user interface device of the image forming apparatus;
instructions for comparing identification information based on the authentication key obtained from the toner refill cartridge with identification information based on the authentication key obtained from the image forming apparatus; and
instructions for, as a result of the comparison, performing the toner refill operation using the toner refill cartridge according to whether the identification information based on the authentication key obtained from the toner refill cartridge matches with the identification information based on the authentication key obtained from the image forming apparatus.

17. The non-transitory computer-readable recording medium of claim 13, wherein the authentication information obtained from the image forming apparatus is stored in one of a data manager of a toner refilling portion on which the toner refill cartridge is mounted when the toner refill cartridge is connected to the image forming apparatus or a non-volatile memory of the image forming apparatus.

18. The non-transitory computer-readable recording medium of claim 13, wherein, before the toner refill cartridge is connected to the image forming apparatus, the authentication information obtained from the toner refill cartridge is transmitted to the toner refill cartridge from a host device and stored in the toner refill cartridge.

* * * * *